United States Patent
Lee et al.

(10) Patent No.: US 8,732,287 B2
(45) Date of Patent: May 20, 2014

(54) SYSTEM FOR MANAGING A VIRTUALIZATION SOLUTION AND MANAGEMENT SERVER AND METHOD FOR MANAGING THE SAME

(75) Inventors: Hyung-Jik Lee, Daejeon (KR); Jeun-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 790 days.

(21) Appl. No.: 12/881,299

(22) Filed: Sep. 14, 2010

(65) Prior Publication Data

US 2011/0106929 A1    May 5, 2011

(30) Foreign Application Priority Data

Nov. 5, 2009    (KR) .................. 10-2009-0106443

(51) Int. Cl.
  *G06F 15/173*    (2006.01)
(52) U.S. Cl.
  USPC ........................................ 709/223; 715/735
(58) Field of Classification Search
  USPC .................. 709/220–223; 715/735
  See application file for complete search history.

(56) References Cited

U.S. PATENT DOCUMENTS

| | | | |
|---|---|---|---|
| 7,926,054 B2* | 4/2011 | Sonderegger et al. | 718/1 |
| 8,141,075 B1* | 3/2012 | Chawla et al. | 718/1 |
| 2003/0110263 A1 | 6/2003 | Shillo | |
| 2008/0168188 A1* | 7/2008 | Yue et al. | 710/15 |
| 2010/0107159 A1* | 4/2010 | Radhakrishnan et al. | 718/1 |
| 2013/0054890 A1* | 2/2013 | Desai et al. | 711/114 |

FOREIGN PATENT DOCUMENTS

| | | |
|---|---|---|
| KR | 10-2004-0071187 | 8/2004 |
| KR | 10-2007-0012210 | 1/2007 |
| KR | 10-2008-0111902 | 12/2008 |
| KR | 10-2009-0063122 | 6/2009 |
| KR | 10-2009-0065126 | 6/2009 |
| WO | WO 2007/011164 A1 | 1/2007 |

* cited by examiner

*Primary Examiner* — Tauqir Hussain
*Assistant Examiner* — Eyob Hagos
(74) *Attorney, Agent, or Firm* — Staas & Halsey LLP (57) ABSTRACT

Disclosed is a system for managing a virtualization solution capable of controlling various kinds of virtualization solutions provided in Xen, Citrix, Vmware, etc., and easily allocating and releasing user management devices and user peripheral devices using virtualization solutions to a user's virtual machine by providing a standardized virtualization solution management system and a management server and a method for managing the same.

11 Claims, 8 Drawing Sheets

SYSTEM FOR MANAGING A VIRTUALIZATION SOLUTION AND MANAGEMENT SERVER AND METHOD FOR MANAGING THE SAME

CROSS REFERENCE TO RELATED APPLICATIONS

This application claims priority to Korean Patent Application No. 10-2009-0106443 filed on Nov. 5, 2009, the entire contents of which are herein incorporated by reference.

BACKGROUND OF THE INVENTION

1. Field of the Invention

The present invention relates to a system for managing a virtualization solution and a management server and a method for managing the same.

2. Description of the Related Art

Recently, a desktop virtualization technology has come into the limelight, companies such as Citrix, VMware, etc., have published desktop virtualization solutions.

The solution includes a management tool that can manage a virtual machine using the virtualization technology.

A user uses virtualization services of the companies using the management tool, which are not compatible with each other. In order to solve the problems in a distributed management task force (DMTF), standardization for packaging and arranging a virtual machine image has progressed and a standard of an open virtual format (OVF) has been published.

As a result, the OVF is used as the standard for the virtual machine image in order to provide virtualization solution for companies. Therefore, the present invention suggests the management tool can generalize a management API and a user interface used in the management tool and can be used even in the virtualization solutions of any companies.

SUMMARY OF THE INVENTION

It is an object of the present invention to provide a system for managing a virtualization solution capable of controlling various kinds of virtualization solutions provided in Xen, Citrix, Vmware, etc., and easily allocate and release user management devices and user peripheral devices using virtualization solutions to a virtual machine by providing a standardized solution management system and a server and a method for managing the same.

According to the present invention, there is provided a server for managing a virtualization solution managing one or more node server that is allocated with virtual resources and provides services to client terminals connected to the Internet, including: a management interface that provides a menu for managing at least one of a user, a virtual machine, peripheral devices, a system, and a computing environment on a display; a management unit that performs a management operation on at least one of the user, the virtual machine, the peripheral devices, the system, and the computing environment according to the menu selected through the management interface; a database that stores information associated with the user, the virtual machine, the peripheral devices, the system, and the computing environment; and a controller that controls the management unit according to the menu selected through the management interface.

The management unit includes: a system management application that manages the system information of the management server; a user management application that manages user information using the virtualization solution; a peripheral device management application that manages information on the peripheral devices existing around the virtual machine or the client terminals; a virtual machine management application that manages the virtual machine; and a computing environment management application that manages the virtual machine use state of the user.

The controller drives any one of the applications according to the menu selected through the management interface and controls the corresponding management operation.

The system management application performs addition/deletion functions of the node server and addition/deletion functions of the storage server allocating the virtual resources to the node server.

The system information includes at least one of a system name, a system IP, a system starting time, a system operating time, a sort of a system CPU, a CPU load, a memory size, an available memory size, a storage space size, a user storage space size.

The user management application performs at least one of the user information adding/deleting functions, the user information changing function, the user log in/log off functions, and the user authenticating function.

The peripheral device management application manages the virtual machine and the peripheral devices existing around the user and peripheral device registering/deleting functions, a peripheral device owner setting function, a peripheral device information changing function, and a peripheral device state confirming function.

The virtual machine management application performs at least one of the starting and ending function, stopping function, restarting function, storing function of the virtual machine, a virtual machine life cycle managing function, and a virtual machine information confirming function.

The information of the virtual machine includes at least one of a virtual machine generating date, a type of operating system, an image size, an image format, a virtual machine name, an UUID, a virtual machine installing node, and a virtual machine installing node IP.

The computing environment management application manages the virtual machine use state of multiple users and performs at least one of a computing environment configuring/releasing function, a computing environment information confirming function, and a computing environment changing function.

The computing environment is configured to include the user, the virtual machine, the peripheral devices, the virtual machine executing server, and the storage server.

The database stores the related information in each table type.

There is provided a system for managing a virtualization solution, including: a storage server that stores virtual machine images, private virtual machine images, and private profile information; at least one node server that is allocated with virtual resources from the storage server and provides services to client terminals connected to the Internet; and a management server that manages the node server, the storage server, the virtual machine, and the peripheral devices.

The storage server includes: a public virtual machine storage unit that stores the public virtual machine images; a private virtual machine storage unit that stores the private virtual machine images; and a private profile storage unit that stores setting information of application programs.

The storage server further includes a private additional disk storage unit that stores the virtual disk images added when the storage capacity of the private virtual machine storage unit is insufficient.

The storage server and the management server communicate with each other by using any one of a network file system (NFS), a network attached storage (NAS), and a storage area network (SAN).

The management server includes: a management interface that provides a menu for managing at least one of a user, a virtual machine, peripheral devices, a system, and a computing environment on a display; and a management unit that performs a management operation on at least one of the user, the system, the virtual machine, the peripheral devices, and the computing environment.

The management unit includes: a system management application that manages the system information of the node server; a user management application that manages the user information using the virtualization solution; and a peripheral device management application that manages information of the peripheral devices existing around the virtual machine or the client terminals.

The system for managing a virtualization solution further includes a virtual machine management application that manages the virtual machine; and a computing environment management application that manages the virtual machine use state of the user.

There is provided a method for managing a virtualization solution allowing a management server to manage one or more node server that is allocated with virtual resources and provides services to client terminals connected to the Internet, including: displaying a menu for managing at least one of a user, a system, a virtual machine, peripheral devices, and a computing environment on a display; driving applications related to the selected menu when any one of the menus is selected; and performing a management operation using the driven applications.

According to the exemplary embodiments of the present invention, the system for managing a virtualization solution and a management server and a method for managing the same provide the applications for managing the standardized virtualization solution and the user interface such that the user or the manager using the virtualization system can use or manage the virtualization system regardless of products or manufacturers.

DETAILED DESCRIPTION OF THE PREFERRED EMBODIMENTS

Hereinafter, exemplary embodiments of the present invention will be described in detail with reference to the accompanying drawings. First of all, it is to be noted that in giving reference numerals to elements of each drawing, like reference numerals refer to like elements even though like elements are shown in different drawings.

Advantages and features of the present invention and methods to achieve them will be elucidated from exemplary embodiments described below in detail with reference to the accompanying drawings. However, the present invention is not limited to the exemplary embodiments disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals refers to like components throughout the specification.

Hereinafter, a system for managing a virtualization solution and a management server and a method for managing the same according to exemplary embodiments of the present invention will be described with reference to the accompanying drawings.

Figure 1A:
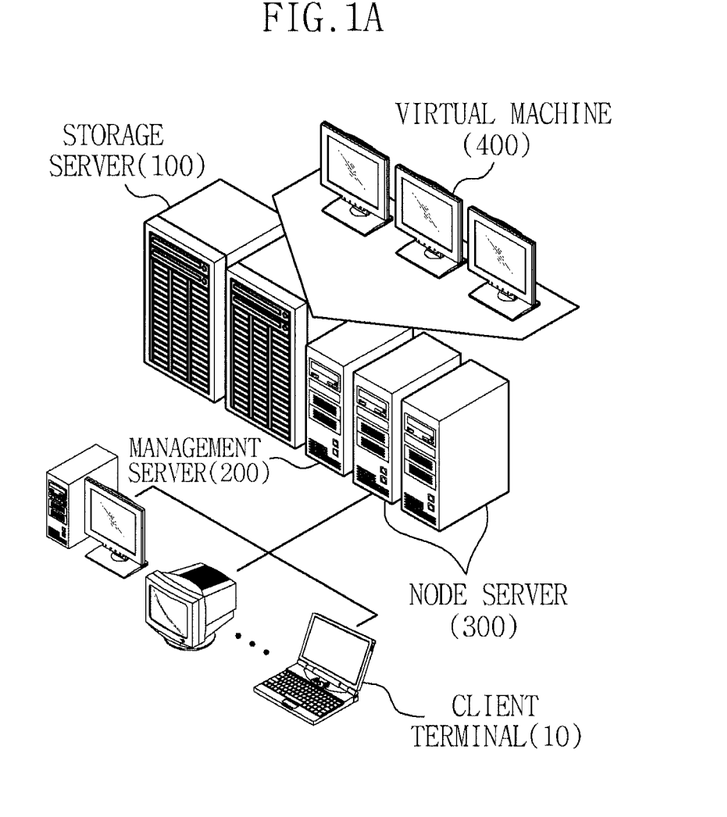
FIGS. 1A and 1B are diagrams showing a structure of virtualization solution system according to the present invention.
Figure 1B:
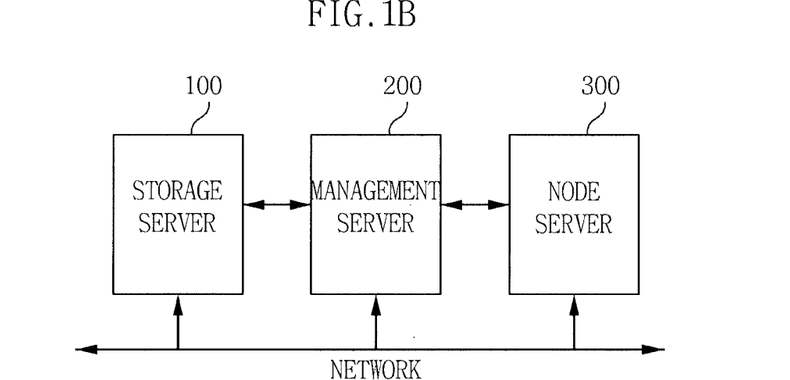

FIGS. 1A and 1B are diagrams showing a structure of a virtualization solution system according to the present invention.

Referring to FIGS. 1A and 1B, the virtualization solution system according to the exemplary embodiment of the present invention is configured to include a storage server 100 that stores information, such as virtual machine images, private virtual machine images, and private profiles, etc., one or more node server 300 that is allocated with virtual resources and provides services to client terminals 10 connected to the Internet, and a management server 200 for managing the node server 300, the storage server 100, a virtual machine 400, and peripheral devices.

In this case, the storage server 100, the management server 200, and the node server 300 communicates with each other by using any one of a network file system (NFS), a network attached storage (NAS), and a storage area network (SAN).

The storage server 100 stores virtual machine images and private disk images and user profiles that will be additionally allocated to the virtual machine.

Figure 2:
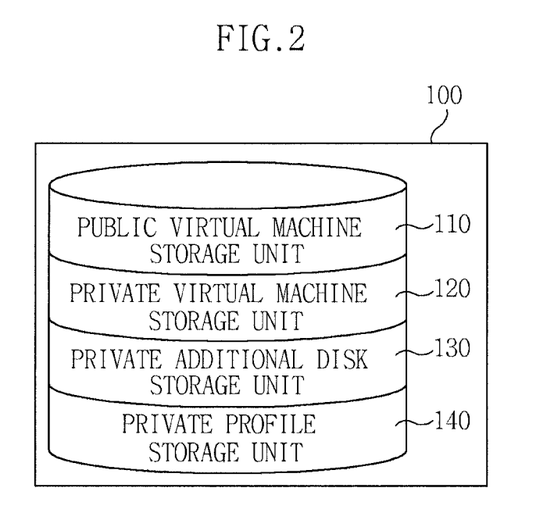
FIG. 2 is a diagram showing a storage server according to the present invention.

FIG. 2 is a diagram showing a storage server according to the present invention.

Referring to FIG. 2, the storage server 100 is configured to include a public virtual machine storage unit 110 that stores public virtual machine images, a private virtual machine storage unit 120 that stores the private virtual machine images, a private additional disk storage unit 130 added when the storage capacity of the private virtual machine storage unit 120 is insufficient, and a private profile storage unit 140 that stores setting information of application programs.

The virtual machine image is classified into a public virtual machine image and a private virtual machine image.

The public virtual machine images are driving system images that are distributed by Microsoft, Apple, Redhat, etc., and the private virtual machine images are virtual machine images generated by applying a Copy-on-Write scheme to the public virtual machine images.

All the users have at least one of their own private virtual images. The private disk image is the virtual disk images that can be added when the capacity of the private virtual image is insufficient.

The user profile stores devices frequently used by the user, user's private information, setting information of application programs of the virtual machine images, etc.

Figure 3:
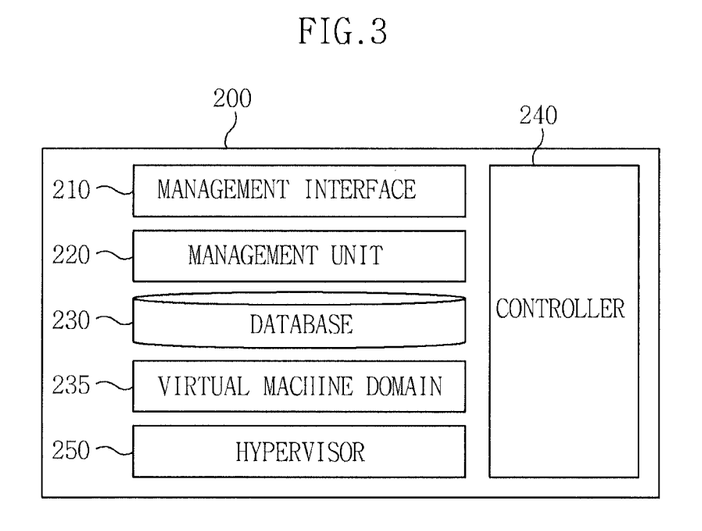
FIG. 3 is a diagram showing a management server according to the present invention.

FIG. 3 is a diagram showing a management server according to the present invention.

Referring to FIG. 3, the management server 200 according to the exemplary embodiment of the present invention is a system in which a management tool proposed in the present invention is mounted and exists in only one to manage one or more node severs 300.

The above-mentioned management server 200 is configured to include a management interface 210, a management unit 220, a database 230, and a controller 240.

The management interface 210 provides a user interface (UI) menu for managing at least one of the user, the system, the virtual machine, and the computing environment on a display according to the control of the controller 240.

The management unit 220 performs the management operation on at least one of the user, the system, the virtual machine, the peripheral devices, and the computing environment according to the control of the controller 240.

Figure 4:
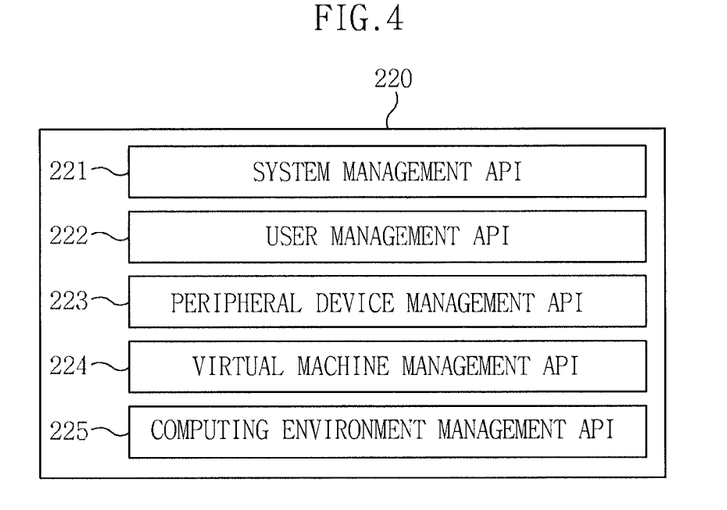
FIG. 4 is a diagram showing a managing unit of a management server according to the present invention.

Virtual machine domain 235 is connected to network file system of the storage server and all system is connected via network As shown in FIG. 4, the above-mentioned management unit 220 is configured to include a system management application (hereinafter, referred to as 'API'), a user management API 222, a peripheral device management API 223, a virtual machine management API 224, and a computing environment management API 225.

FIG. 4 is a diagram showing a management server according to the present invention.

Referring to FIG. 4, the system management API 221 is an API that manages the system information of the management server 200 and performs addition/deletion functions of the management server 200, addition/deletion functions of the storage server 100, and addition/deletion functions of the node servers 300.

In this case, the system information includes information, such as a system name, a system IP, a system starting time, a system operating time, a type of system CPU, a CPU load, a memory size, an available memory size, a storage space size, a user storage space size, etc. The storage space has an API that dynamically expands/reduces the size.

The user management API 222 is an API that manages the user information using the visualization solution and performs the user information adding/deleting functions, the user information changing function, the user log in/log off functions, and the user authenticating function.

The peripheral device management API 223 is an API that manages the virtual machines and the peripheral devices existing around the user and performs peripheral device registering/deleting functions, peripheral device allocating/releasing functions, a peripheral device information outputting functions, a peripheral device owner setting function, a peripheral device information changing function, and a peripheral device state confirming function.

In this case, the peripheral device includes external devices such as a keyboard, a mouse, a monitor, a camera, a speaker, a mobile storage device, a printer, a scanner, etc., and the device in the virtual machine includes devices such as a CPU, a memory, a hard disk, a CD-ROM, a network device, a serial, a console, etc.

The virtual machine management API 224 is an API that manages the virtual machine and performs the starting function, ending function, stopping function, restarting function, storing function, recovering function of the virtual machine, etc., a virtual machine life cycle managing function, and a virtual machine information confirming function.

The virtual machine information includes information such as a virtual machine generating date, a type of operating system, an image size, an image format, a virtual machine name, an UUID, a virtual machine installing node, a virtual machine installing node IP, etc.

The computing environment management API 225 is an API that manages the virtual machine use state of multiple users and performs a computing environment configuring/releasing function, a computing environment information confirming function, and a computing environment changing function, etc.

In this case, the computing environment is configured to include the user, the virtual machine, the peripheral devices, the virtual machine executing server, and the storage server.

Figure 6:
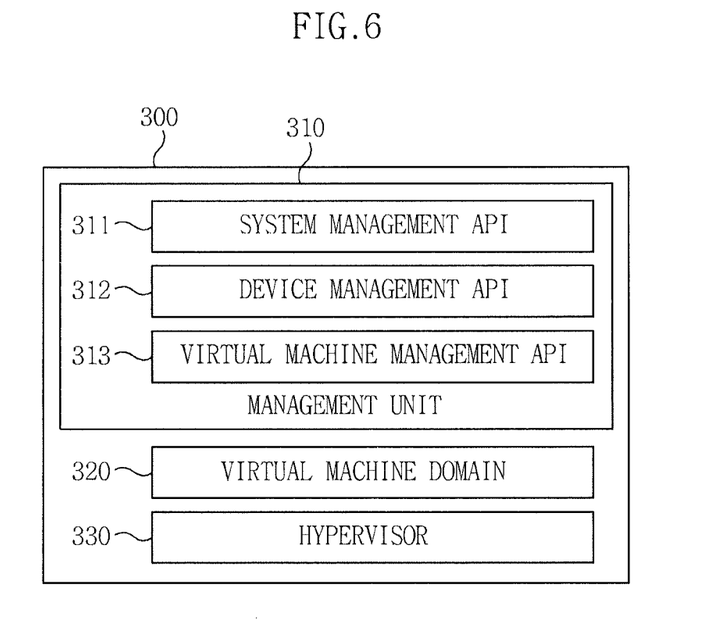
FIG. 6 is a diagram showing a node server according to the present invention.

Referring to FIG. 6, the node server 300 according to the present invention is mounted with a system management API 311, a peripheral device management API 312, and a virtual machine management API 313 and the function thereof performs the same as the system management API 221, the peripheral device management API 223, and the virtual machine management API 224 of the management server 200.

In this case, the user and the computing environment management are performed in the management server 200 and the management of the peripheral devices, the virtual machine, and the system performs remote procedure call (RPC) of the corresponding system according to the system in which the virtual machine is disposed.

As described above, the APIs 221 to 225 of the management unit 220 have the RPC type and basically have a structure that all the APIs are called through the management interface 210.

For example, when there is the virtual machine 'A' in the node server 300, in the case of the start of the 'A' virtual machine, the manager or the user of the management server 200 performs the start of the 'A' virtual machine through the management interface 210 to drive the virtual machine management API 224.

The virtual machine management API 224 compares the IP of the current management server 200 with the IP information of the node server 300 in which the 'A' virtual machine is installed and if it is determined that the 'A' virtual machine exists in the management server 200, performs the starting function of the 'A' virtual machine.

However, the virtual machine management API 224 compares the IP of the management server 200 with the IP information of the node server 300 in which the 'A' virtual machine is installed and if it is determined that the IP is different, calls the virtual machine management API 313 of the node server 300 in which the 'A' virtual machine is installed in the RPC type. The APIs of the device allocation, the system information, etc., perform the above-mentioned procedures.

Figure 5:
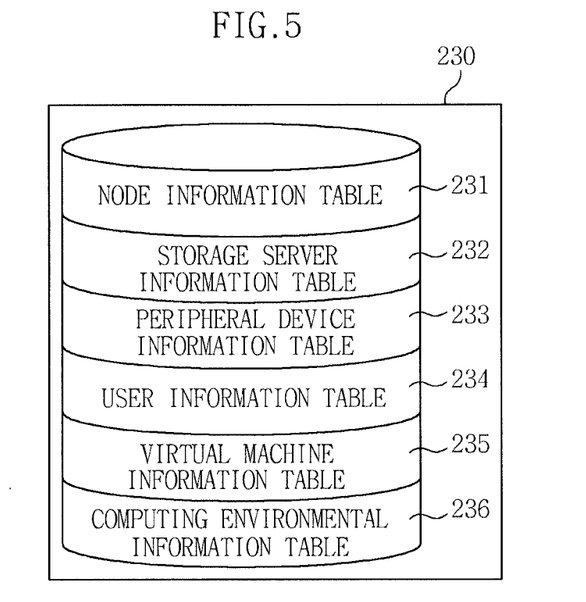
FIG. 5 is a diagram showing a database of the management server according to the present invention.

FIG. 5 is a diagram showing the database of the management server according to the present invention.

Referring to FIG. 5, the database 230 of the management server 200 according to the present invention is configured to include a node server information table 231, a storage server information table 232, a peripheral device information table 233, a user information table 234, a virtual machine information table 235, and a computing environment information table 236.

The node server information table 231 stores information such as a system name, a system IP, a system starting time, a system operating time, an OS name, a kernel version, an architecture name, a CPU speed, a CPU vendor, a processor name, a CPU model, a CPU usage rate, the entire memory, available memory, the entire disk size, available disk size, and a disk usage rate, etc.

The storage server information table 232 stores information such as a system name, a system IP, mount points of the node server 300 and the management server 200, a mount point of the storage server 100, an ID of the storage server 100, a size of the public virtual machine storage unit 110, a size of the private virtual machine storage unit 120.

The peripheral device information table 233 stores information such as a peripheral device name, a bus number, a peripheral device number, a processing speed of the peripheral devices, a version of the peripheral devices, a Sysfs Path, a vendor ID, a product ID, types of peripheral devices, an owner of the peripheral devices, an IP of the peripheral devices, an end point of the peripheral devices, a mount point of the peripheral devices, a size of the peripheral device, allocation or not of the peripheral devices, etc.

The user information table 234 stores information, such as a user ID, a user name, a user password, a user address, a user birth date, a user type, a user mail, etc.

The virtual machine information table 235 stores information, such as a virtual machine name, a name of a node server 100 and a management server 200, IPs of a node server 100 and a management server 200, an UUID, an image generating time, an OS type, an OS variant, an image size, an image type, a name of a base image, a name of an additional disk image, a additional disk image size, etc.

The computing environment information table 236 stores a computing environment name, a user name, a virtual machine name, an UUID, peripheral devices related information.

Figure 7:
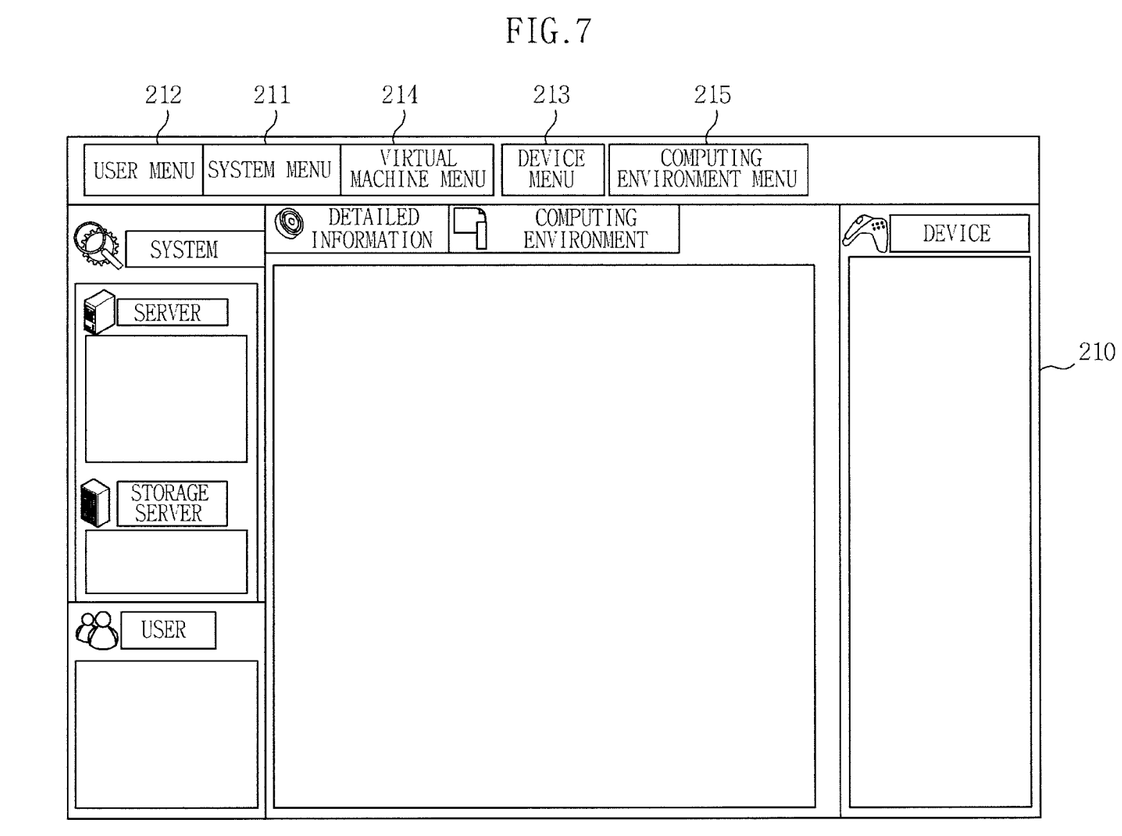
FIG. 7 is a diagram showing one example of a management interface according to the present invention.

Meanwhile, FIG. 7 is a diagram showing one example of the management interface 210 according to the present invention.

Referring to FIG. 7, the management interface 210 is configured to include a system menu 211, a user menu 212, a virtual machine menu 213, a peripheral device menu 214, and a computing environment menu 215.

The system menu 211 shows a list and the management server 200 and the node server 300 and a list of the storage server 100.

The list of the peripheral devices around the user is shown in the peripheral device menu 214.

The components of the currently used computing environment are shown in the computing environment menu 215 and the database information of each component is visually represented in the detailed information menu.

The management interface 210 is configured based on a web and is shown in the manager or the user through the manager or user log in and the user authenticating procedure. The manager first adds the public images and the user of the node server 300, the management server 200, and the storage server 100 and the user images.

When the peripheral devices are connected to the node server 300 or the management server 200, the list is automatically shown in the peripheral device menu 213.

All the legacy devices are registered in the public devices and the private terminals or the private storage devices enable the manager to allocate the owner to the devices.

The user can perform a log in with his/her own ID, such that only his/her own virtual machine image and public device and his/her devices are shown.

The user drags his/her own virtual machine image to the computing environmental window or generates his/her computing environment by using the virtual machine starting function of the virtual machine menu 214.

Thereafter, the user drags the peripheral devices in the peripheral device menu 213 to his/her own virtual machine icon, such that he/she can dynamically allocate the peripheral devices to his/her virtual machine. Further, the releasing process can be achieved by dragging each icon to an original position. The manager can confirm the computing environment of all the users.

Meanwhile, the controller 240 of the management server 200 controls the entire operation of the components of the management server 200. Hereinafter, a process for managing a virtualization solution according to the present invention will be described with reference to FIGS. 8 to 10.

Figure 8:
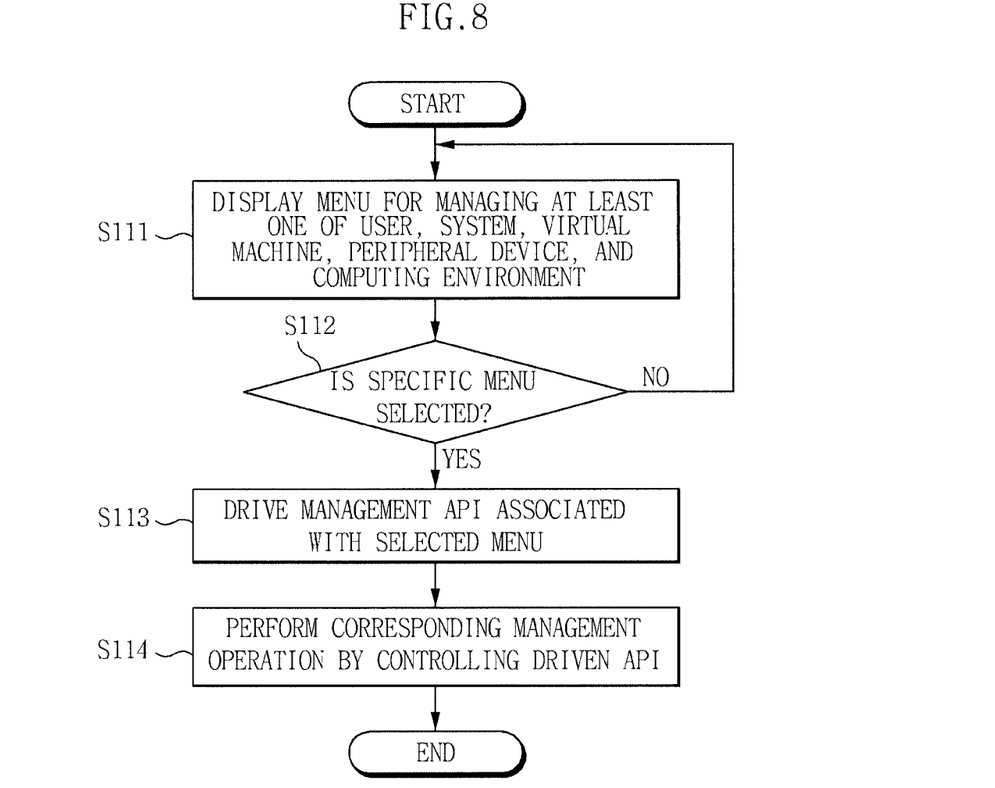
FIG. 8 is a flow chart showing a process of managing a virtualization solution of a management server according to the present invention.
Figure 9:
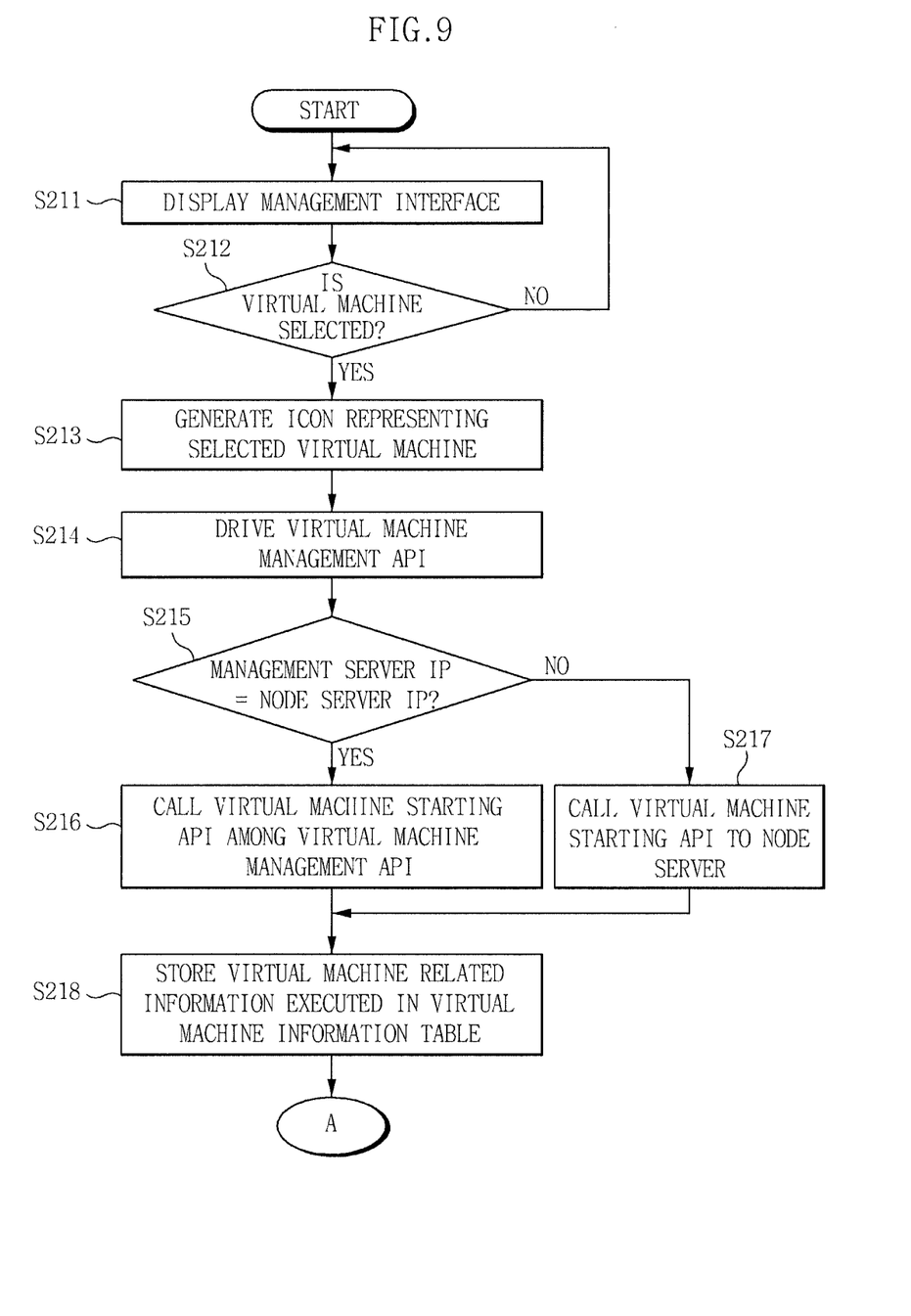
FIG. 9 is a flow chart showing a process of executing a virtual machine of a management server according to the present invention.
Figure 10:
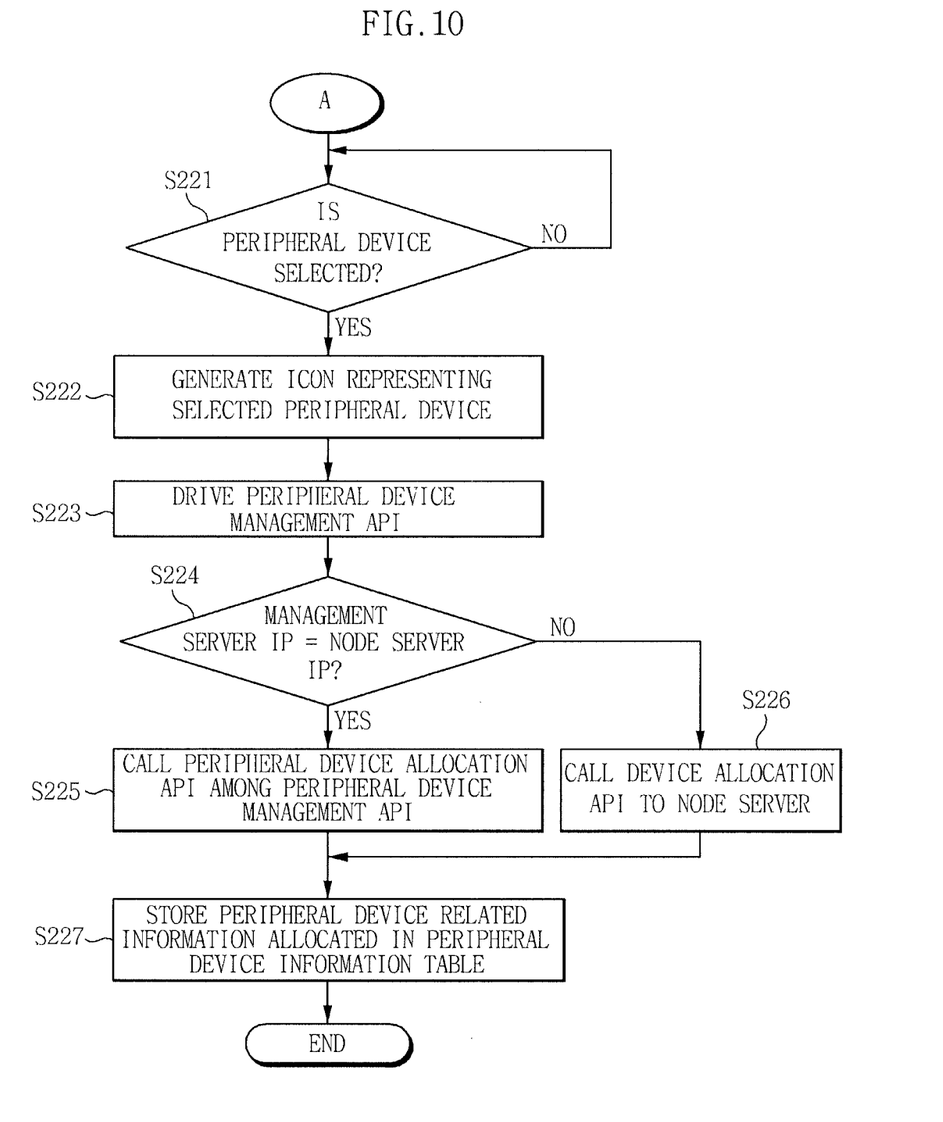
FIG. 10 is a flow chart showing a process of allocating peripheral devices in the state where the virtual machine is executed in FIG. 9.

FIG. 8 shows a process for managing a virtualization solution of a management server according to the present invention, FIG. 9 is a flow chart showing a process of executing a virtualization machine of a management server according to the present invention, and FIG. 10 is a flow chart showing a process of allocating peripheral devices in the state where the virtual machine is executed in FIG. 9.

Referring to FIG. 8, the controller 240 of the management server 200 represents the management interface 210 that is configured to include the system menu 211, the user menu 212, the virtual machine menu 213, the peripheral device menu 214, and the computing environment menu 215 (S111).

When specific menus are selected from the menus 211 to 215 in the management interface 210 (S112), the controller 240 controls the management unit 220 to drive the APIs corresponding to the selected menus (S113) and controls the driven API to perform the corresponding management operation (S114).

Next, a process of executing the virtual machine using the management interface 210 will be described with reference to FIG. 9.

Referring to FIG. 9, the controller 240 represents the virtual machine list in the virtual machine menu 214 when the virtual machine menu 214 is selected through the state where the management interface 210 is represented (S211).

In this case, when the specific virtual machine is selected in the list (S212), the controller 240 generates icons representing the selected virtual machine and displays them on the computer environmental window shown in FIG. 7 (S213) and drives the virtual machine management API 224 in the management unit 220 (S214).

When the starting command of the selected virtual machine is input by the user, the controller 240 compares the IP in the current management server 200 with the IP of the node server 300 in which the selected virtual machine is installed.

If the IP of the management server 200 is identical with the IP of the node server 300 in which the selected virtual machine is installed (S216), the controller 240 determines that the selected virtual machine exists in the management server 200 and calls the virtual machine starting API among the virtual machine management APIs 224 in the management unit 220 to execute the virtual machine (S216).

However, if the IP of the management server 200 is not identical with the IP of the node server 300 in which the selected virtual machine is installed, the controller 240 determines that the selected virtual machine does not exist in the management server 200 and calls the virtual machine starting API to start the selected virtual machine to the node server 300 through the RPC and to execute the virtual machine (S217).

The controller 240 stores the information associated with the executed virtual machine in the virtual machine information table 235 in the database 230 (S218).

Next, referring to FIG. 10, the controller 240 represents the list of peripheral devices positioned around the user in the peripheral device menu 213 when the peripheral device menu 213 is selected in the state where the virtual machine is executed by the process of FIG. 9.

In this case, when the specific peripheral devices are selected in the list (S221), the controller 240 generates icons representing the selected peripheral devices and displays them on the computer environmental window shown in FIG. 7 (S222) and drives the peripheral device management API 223 in the management unit 220 (S223).

When the allocating command of the selected peripheral devices is input by the user, the controller 240 compares the IP in the current management server 200 with the IP of the node server 300 in which the selected virtual machine is installed.

If the IP of the management server 200 is identical with the IP of the node server 300 (S224), the controller 240 determines that the device allocating API of the selected peripheral devices exists in the driven peripheral device management API 223 and calls the device allocation API among the peripheral device management APIs 223 to allocate the peripheral device (S225).

However, if the IP of the management server 200 is not identical with the IP of the node server 300, the controller 240 determines that the device allocating API of the selected peripheral devices does not exist in the driven peripheral device management API 223 and calls the API for the device allocation of the selected peripheral devices to the node server 300 through the RPC (S226).

The controller 240 stores the information associated with the allocated peripheral device in the peripheral device information table 233 in the database 230 (S218).

While configurations of certain embodiments have been described above with reference to the accompanying drawings, it is by way of example only. Those skilled in the art can make various modifications and changes within the technical spirit of the present invention. Accordingly, the actual technical protection scope of the present invention must be determined by the spirit of the appended claims.

The system for managing a virtualization system and the server and method for managing the same described above are not limited to the configuration and method of the embodiments as described above, but the embodiments may be configured by selectively combining all the embodiments or some of the embodiments so that various modifications can be made.

What is claimed is:

1. A management server for managing a virtualization solution managing one or more node server that is allocated with virtual resources and provides services to client terminals connected to internet, comprising:
    a management interface that provides a menu for selectively managing a selected one of a user, a virtual machine, peripheral devices, a system, and a computing environment on a display;
    a management unit that performs a management operation on at least one of the user, the virtual machine, the peripheral devices, the system, and the computing environment according to the menu selected through the management interface;
    a database that stores information associated with the user, the virtual machine, the peripheral devices, the system, and the computing environment; and
    a controller that controls the management unit according to the menu selected by the user through the management interface,
    wherein the selected one of the user, the virtual machine, the peripheral devices, the system, and the computing environment is managed on a display based on the user selection, and
    wherein the management unit includes:
    a system management application that manages the system information of the management server;
    a user management application that manages user information using the virtualization solution;
    a peripheral device management application that manages information on the peripheral devices existing around the virtual machine or the client terminals, wherein the peripheral device management application performs at least one of peripheral device registering and deleting functions, a peripheral device owner setting function, a peripheral device information changing function, and a peripheral device state confirming function;
    a virtual machine management application that manages the virtual machine; and
    a computing environment management application that manages the virtual machine use state of the user.

2. The management server for managing a virtualization solution according to claim 1, wherein the controller drives any one of the applications according to the menu selected through the management interface and controls the corresponding management operation.

3. The management server for managing a virtualization solution according to claim 1, wherein the system management application performs addition/deletion of functions of the node server and addition/deletion functions of the storage server allocating the virtual resources to the node server.

4. The management server for managing a virtualization solution according to claim 1, wherein the system information includes at least one of a system name, a system IP, a system starting time, a system operating time, a sort of a system CPU, a CPU load, a memory size, an available memory size, a storage space size, a user storage space size.

5. The management server for managing a virtualization solution according to claim 1, wherein the user management application performs at least one of the user information adding/deleting functions, the user information changing function, the user log in/log off functions, and the user authenticating function.

6. The management server for managing a virtualization solution according to claim 1, wherein the virtual machine management application performs at least one of the starting and ending function, stopping function, restarting function, storing function of the virtual machine, a virtual machine life cycle managing function, and a virtual machine information confirming function.

7. The management server for managing a virtualization solution according to claim 6, wherein the information of the virtual machine includes at least one of a virtual machine generating date, a sort of an operating system, an image size, an image format, a virtual machine name, an UUID, a virtual machine installing node, and a virtual machine installing node IP.

8. The management server for managing a virtualization solution according to claim 1, wherein the computing environment management application manages the virtual machine use state of multiple users and performs at least one of a computing environment configuring/releasing function, a computing environment information confirming function, and a computing environment changing function.

9. The management server for managing a virtualization solution according to claim 8, wherein the computing environment is configured to include the user, the virtual machine, the peripheral devices, the virtual machine executing server, and the storage server.

10. The management server for managing a virtualization solution according to claim 1, wherein the database stores the related information in a table for each table type comprising a node server information table, a storage server information table, a peripheral device information table, a user information table, a virtual machine information table, and a computing environment information table.

11. A method for managing a virtualization solution allowing a management server to manage one or more node server that is allocated with virtual resources and provides services to client terminals connected to internet, comprising:
  displaying a menu for selectively managing a selected one of a user, a system, a virtual machine, peripheral devices, and a computing environment on a display;
  driving applications related to the selected menu when any one of the menus is selected; and
  performing a management operation using the driven applications,
wherein the selected one of the user, the virtual machine, the peripheral devices, the system, and the computing environment is managed on a display based on the user selection,
wherein the management operation includes:
  a system management application that manages the system information of the management server;
  a user management application that manages user information using the virtualization solution;
  a peripheral device management application that manages information on the peripheral devices existing around the virtual machine or the client terminals, wherein the peripheral device management application performs at least one of peripheral device registering and deleting functions, a peripheral device owner setting function, a peripheral device information changing function, and a peripheral device state confirming function;
  a virtual machine management application that manages the virtual machine; and
  a computing environment management application that manages the virtual machine use state of the user.

* * * * *